US012785573B2

(12) United States Patent
Wu et al.

(10) Patent No.: US 12,785,573 B2
(45) Date of Patent: Nov. 3, 2026

(54) MULTI-OUTPUT VOLTAGE CONVERSION APPARATUS AND OPERATION METHOD OF THE SAME HAVING FAST LOAD TRANSIENT RESPONSE

(71) Applicant: REALTEK SEMICONDUCTOR CORPORATION, Hsinchu (TW)

(72) Inventors: Kuo-Chun Wu, Hsinchu (TW); Shih-Cheng Wang, Hsinchu (TW); Wen-Hau Yang, Hsinchu (TW); Shih-Chieh Chen, Hsinchu (TW); Chang-Fu Chin, Hsinchu (TW); Chieh-Lun Chiang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 93 days.

(21) Appl. No.: 19/057,269

(22) Filed: Feb. 19, 2025

(65) Prior Publication Data

US 2025/0274048 A1 Aug. 28, 2025

(30) Foreign Application Priority Data

Feb. 22, 2024 (TW) ................................ 113106452

(51) Int. Cl.
*H02M 3/335* (2006.01)
*H02M 1/00* (2007.01)
*H02M 1/32* (2007.01)

(52) U.S. Cl.
CPC ..... *H02M 3/33561* (2013.01); *H02M 1/0019* (2021.05); *H02M 1/32* (2013.01); *H02M 3/33576* (2013.01)

(58) Field of Classification Search
None
See application file for complete search history.

(56) References Cited

U.S. PATENT DOCUMENTS

| | | | | |
|---|---|---|---|---|
| 10,622,900 | B1 * | 4/2020 | Wei | H02M 3/1584 |
| 2020/0304020 | A1 * | 9/2020 | Lu | H02M 3/155 |
| 2021/0175790 | A1 * | 6/2021 | Ye | H02M 1/08 |
| 2023/0216409 | A1 * | 7/2023 | Ravi | G06F 1/26 323/282 |
| 2025/0112552 | A1 * | 4/2025 | Xu | H02M 1/0016 |

* cited by examiner

*Primary Examiner* — Kim Huynh
(74) *Attorney, Agent, or Firm* — WPAT, PC

(57) ABSTRACT

The present disclosure discloses a multi-output voltage conversion apparatus. An input switch circuit couples a first terminal to a voltage input terminal to perform a charging procedure or to a ground terminal to perform a discharging procedure. An inductor generates a current according to a voltage difference between the first and the second terminals. Each of output circuits couples the second terminal to a corresponding output terminal generating a corresponding output voltage. A control circuit determines a selected output circuit to be enabled from candidate output circuits having the corresponding output voltage being lower than a corresponding lower limit threshold value, controls the input switching circuit to perform the charging procedure, determines that the charging procedure is finished, controls the input switch circuit to perform the discharging procedure and determines that the discharging procedure is finished so as to perform the determining procedure again.

20 Claims, 7 Drawing Sheets

| | | | | | | | | | | | | | | | | |
|---|---|---|---|---|---|---|---|---|---|---|---|---|---|---|---|---|
| COA | X | X | X | X | X | X | 1 | 0 | X | 1 | 0 | 0 | 1 | 0 | 0 | 0 |
| COB | 1 | 0 | 0 | 0 | X | X | X | X | X | X | 1 | 0 | X | 1 | 0 | 0 |
| COC | X | 1 | 0 | 0 | 1 | 0 | 0 | 0 | X | X | X | X | X | X | 1 | 0 |
| COD | X | X | 1 | 0 | X | 1 | 0 | 0 | 1 | 0 | 0 | 0 | X | X | X | X |
| Current | S1 | S1 | S1 | S1 | S2 | S2 | S2 | S2 | S3 | S3 | S3 | S3 | S4 | S4 | S4 | S4 |
| Next | S2 | S3 | S4 | S1 | S3 | S4 | S1 | S2 | S4 | S1 | S2 | S3 | S1 | S2 | S3 | S4 |

MULTI-OUTPUT VOLTAGE CONVERSION APPARATUS AND OPERATION METHOD OF THE SAME HAVING FAST LOAD TRANSIENT RESPONSE

BACKGROUND OF THE INVENTION

1. Field of the Invention

The present disclosure relates to a multi-output voltage conversion apparatus and a multi-output voltage conversion apparatus operation method having fast load transient response.

2. Description of Related Art

Along with the development of portable electronic products, a power apparatus in a SoC product is required to provide different output powers. If a plurality of low dropout regulators are used therein to provide the powers of different voltages, the efficiency becomes lower. If a plurality of DC-to-DC converters are used therein to provide the powers of different voltages, the size and the cost of the circuit become larger. As a result, single inductor multiple output (SIMO) DC-to-DC converters become a better option. However, such a configuration has an insufficient load transient response and is unable to provide an elastic output control mechanism among output voltages.

SUMMARY OF THE INVENTION

In consideration of the problem of the prior art, an object of the present disclosure is to provide a multi-output voltage conversion apparatus and a multi-output voltage conversion apparatus operation method having fast load transient response.

The present invention discloses a multi-output voltage conversion apparatus having a fast load transient response that includes an input switch circuit, an inductor, a plurality of output circuits and a control circuit. The input switch circuit is configured to selectively couple a first terminal to a voltage input terminal to perform a charging procedure or couple the first terminal to a ground terminal to perform a discharging procedure. The inductor is electrically coupled between the first terminal and a second terminal and is configured to generate an inductor current according to a voltage difference between the first terminal and the second terminal. Each of the output circuits couples the second terminal to a corresponding output terminal of a plurality of output terminals when being enabled, the corresponding output terminal being configured to generate a corresponding output voltage of a plurality of output voltages. The control circuit is electrically coupled to the input switch circuit and the output circuits and is configured to perform a determining procedure to determine at least one candidate output circuit having the corresponding output voltage lower than a corresponding lower limit threshold value from the output circuits, and determine a selected output circuit from the at least one candidate output circuit according a predetermined order; control the input switch circuit to perform the charging procedure to charge the inductor and perform time counting of a charging time; determine that the charging procedure is finished according to the corresponding output voltage larger than the corresponding lower limit threshold value and the charging time larger than a charging time threshold value; control the input switch circuit to perform the discharging procedure to discharge the inductor and perform time counting of a discharging time; and determine that the discharging procedure is finished according to the discharging time larger than a discharging time threshold value to perform the determining procedure of a next iteration.

The present invention also discloses a multi-output voltage conversion apparatus operation method having fast load transient response that includes steps outlined below. Selectively, a first terminal is coupled to a voltage input terminal to perform a charging procedure or to a ground terminal to perform a discharging procedure by an input switch circuit. By an inductor electrically coupled between the first terminal and a second terminal, an inductor current is generated according to a voltage difference between the first terminal and the second terminal. By a plurality of output circuits each coupling the second terminal to a corresponding output terminal of a plurality of output terminals when being enabled, a corresponding output voltage of a plurality of output voltages is generated at the corresponding output terminal. A determining procedure is performed to determine at least one candidate output circuit having the corresponding output voltage lower than a corresponding lower limit threshold value from the output circuits, and a selected output circuit is determined from the at least one candidate output circuit according a predetermined order by a control circuit electrically coupled to the input switch circuit and the output circuits. The input switch circuit is controlled to perform the charging procedure to charge the inductor and perform time counting of a charging time by the control circuit. The charging procedure is determined to be finished according to the corresponding output voltage larger than the corresponding lower limit threshold value and the charging time larger than a charging time threshold value by the control circuit. The input switch circuit is controlled to perform the discharging procedure to discharge the inductor and perform time counting of a discharging time by the control circuit. The discharging procedure is determined to be finished according to the discharging time larger than a discharging time threshold value by the control circuit to perform the determining procedure of a next iteration.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a multi-output voltage conversion apparatus and a multi-output voltage conversion apparatus operation method having fast load transient response to dynamically determine the output circuits to be enabled according to the relation between the output voltages and the upper limit value, such that not only a fast transient response is obtained, but also either the charging time that is too short in a light-load condition or the discharging time that is too short in the heavy load condition can be avoided by configuring the charging time threshold value and the discharging time threshold value. Both the requirements of the light load condition and the heavy load condition can be satisfied.

Figure 1:
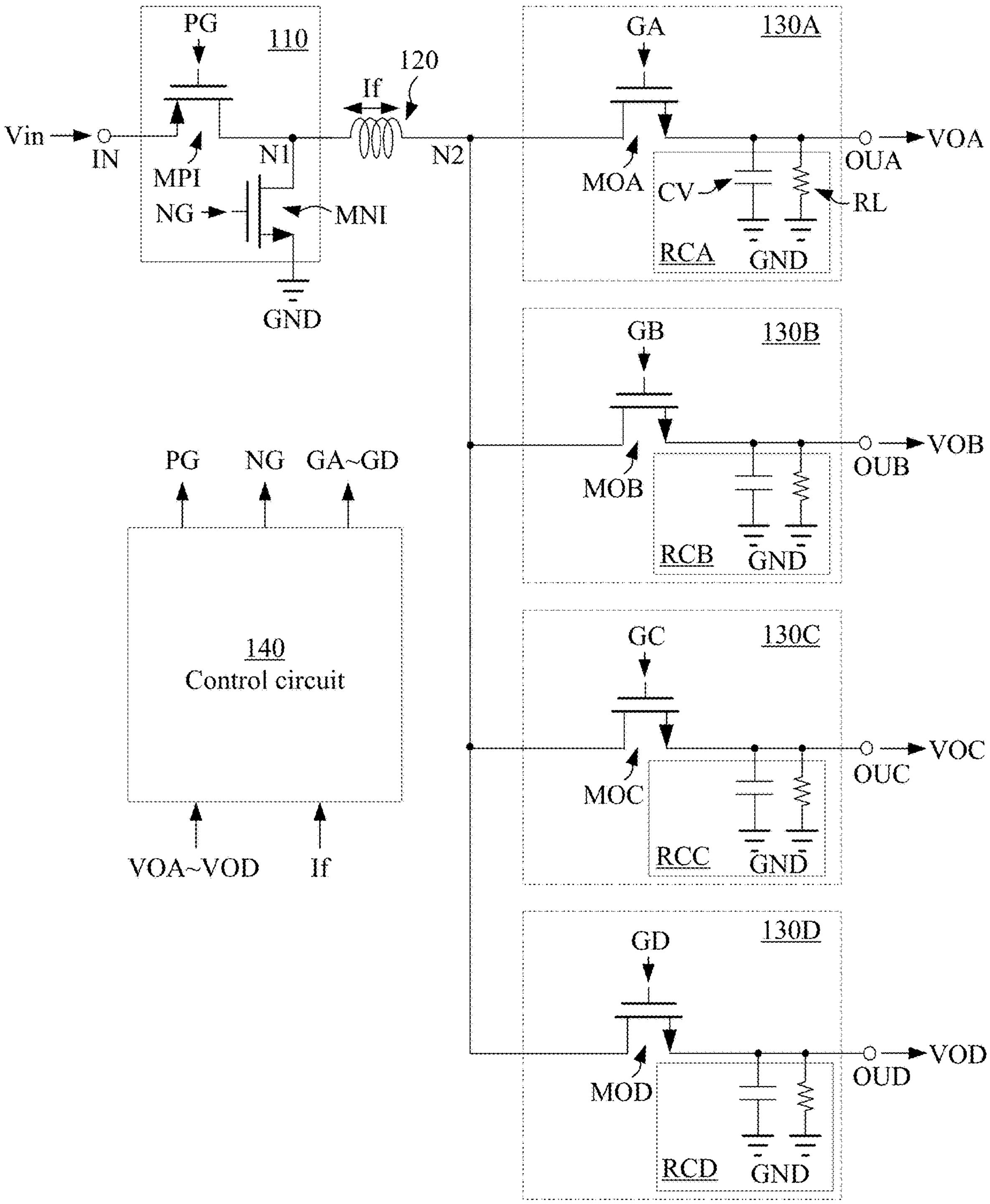
FIG. 1 illustrates a block diagram of a multi-output voltage conversion apparatus having fast load transient response according to an embodiment of the present invention

Reference is now made to FIG. 1. FIG. 1 illustrates a block diagram of a multi-output voltage conversion apparatus 100 having fast load transient response according to an embodiment of the present invention.

The multi-output voltage conversion apparatus 100 includes an input switch circuit 110, an inductor 120, a plurality of output circuits 130A~130D, and a control circuit 140.

The input switch circuit 110 configured to selectively couple a first terminal N1 to a voltage input terminal IN to perform a charging procedure or couple the first terminal N1 to a ground terminal GND to perform a discharging procedure. The inductor 120 is electrically coupled between the first terminal N1 and a second terminal N2 and is configured to generate an inductor current If according to a voltage difference between the first terminal N1 and the second terminal N2.

In an embodiment, the input switch circuit 110 includes an input P-type transistor MPI and an input N-type transistor MNI in turn electrically coupled between the voltage input terminal IN and the ground terminal GND through the first terminal N1 to receive an input voltage Vin from the voltage input terminal IN.

More specifically, a source and a drain of the input P-type transistor MPI are respectively electrically coupled to the voltage input terminal IN and the first terminal N1. A gate of the input P-type transistor MPI receives a first input control signal PG that turns on or turns off the input P-type transistor MPI. A drain and a source of the input N-type transistor MNI are respectively electrically coupled to the first terminal N1 and the ground terminal GND. A gate of the input N-type transistor MNI receives a second input control signal NG that turns on or turns off the input N-type transistor MNI.

According to the states of the first input control signal PG and the second input control signal NG, the input switch circuit 110 selectively couples the first terminal N1 to the voltage input terminal IN or the ground terminal GND to perform the charging procedure or the discharging procedure on the inductor 120.

For example, when the first input control signal PG is at the low state and when the second input control signal NG is at the low state, the input P-type transistor MPI turns on and the input N-type transistor MNI turns off. The input switch circuit 110 couples the first terminal N1 to the voltage input terminal IN through the input P-type transistor MPI that is turned on to receive the input voltage Vin from the voltage input terminal IN through the input P-type transistor MPI and the first terminal N1 to perform the charging procedure on the inductor 120.

On the other hand, when the first input control signal PG is at the high state and the second input control signal NG is at the high state, the input P-type transistor MPI turns off and the input N-type transistor MNI turns on. The input switch circuit 110 couples the first terminal N1 to the ground terminal GND through the input N-type transistor MNI that is turned on to perform the discharging procedure on the inductor 120 through a path from the first terminal N1, the input N-type transistor MNI to the ground terminal GND.

When the first input control signal PG is at the high state and the second input control signal NG is at the low state, the input P-type transistor MPI and the input N-type transistor MNI both turn off. The input switch circuit 110 disconnects the first terminal N1 from either the voltage input terminal IN or the ground terminal GND and none of the charging procedure and the discharging procedure is performed.

Each of the output circuits 130A~130D couples the second terminal N2 to a corresponding output terminal of a plurality of output terminals OUA~OUD when being enabled, the corresponding output terminal being configured to generate a corresponding output voltage of a plurality of output voltages VOA~VOD.

In an embodiment, the output circuits 130A~130D respectively correspond to enabling signals GA~GD to be turned on so as to be enabled or to be turned off so as to be disabled.

In an embodiment, take the output circuit 130A as an example, the output circuit 130A comprises an output transistor MOA electrically coupled to the second terminal N2 and a corresponding output terminal QUA and a RC circuit RCA electrically coupled between the corresponding output terminal QUA and the ground terminal GND.

More specifically, the output transistor MOA is an N-type transistor. The drain and a source of the output transistor MOA are respectively electrically coupled to the second terminal N2 and the corresponding output terminal QUA. The gate of the output transistor MOA receives a corresponding enabling signal GA that turns on or turns off the output transistor MOA. In an embodiment, the RC circuit RCA may include at least one load resistor RL and at least one voltage stabilizing capacitor CV electrically couple in parallel. However, in other embodiments, the RC circuit RCA may include other components without affecting the charging and discharging function thereof.

According to the state of the enabling signal GA, the output transistor MOA turns on or turns off such that the output circuit 130A is enabled or disabled. For example, when the enabling signal GA is at the high state, the output transistor MOA turns on such that the output circuit 130A is enabled to couple the second terminal N2 to the corresponding output terminal OUA. When the enabling signal GA is at the low state, the output transistor MOA turns off such that the output circuit 130A is disabled to disconnect the second terminal N2 from the corresponding output terminal OUA. According to the turn-on and turn-off of the output transistor MOA and the charging activity and the discharging activity of the RC circuit RCA, the output circuit 130A generates the corresponding output voltage VOA at the corresponding output terminal OUA.

Similarly, the output circuit 130B includes an output transistor MOB and a RC circuit RCB to operate according to the enabling signal GB to generate the corresponding output voltage VOB at the corresponding output terminal OUB. The output circuit 130C includes an output transistor MOC and a RC circuit RCC to operate according to the enabling signal GC to generate the corresponding output voltage VOC at the corresponding output terminal OUC. The output circuit 130D includes an output transistor MOD and a RC circuit RCD to operate according to the enabling signal GD to generate the corresponding output voltage VOD at the corresponding output terminal OUD. The detail configuration and operation of the output circuit 130B~130D are not described herein.

In FIG. 1, the control circuit 140 is illustrated as an independent block. However, the control circuit 140 actually is electrically coupled to the input switch circuit 110 and the output circuits 130A~130D. The control circuit 140 is configured to receive the output voltages VOA~VOD and the inductor current If to generate the first input control signal PG, the second input control signal NG and the enabling signals GA~GD accordingly to control the operation of the input switch circuit 110 and the output circuits 130A~130D such that the multi-output voltage conversion apparatus 100 has the fast transient response.

The control circuit 140 performs a determining procedure to determine at least one candidate output circuit having the corresponding output voltage lower than a corresponding lower limit threshold value from the output circuits 130A~130D, and determines a selected output circuit from the at least one candidate output circuit according a predetermined order. In an embodiment, for different output circuits 130A~130D, the same, partially the same or different corresponding lower limit threshold values can be used.

The control circuit 140 controls the input switch circuit 110 to perform the charging procedure to charge the inductor 120 and perform time counting of a charging time. Under such a condition, the selected output circuit that is enabled operates according to the internal components to receive the inductor current If from the second terminal N2 to generate the corresponding output voltage at the corresponding output terminal. Under such a condition, the slope of the inductor current If is a result of a voltage difference between the input voltage Vin and the corresponding output voltage divided by an inductance of the inductor 120. Take the condition that the output circuit 130A is enabled as an example, the slope of the increasing current thereof is $dIf/dt=(Vin-VOA)/L$. In an embodiment, when the output circuit 130A is enabled to be charged, the RC circuit RCA generates a load current ILOAD that is a result of the voltage value of the output voltage VOA divided by a resistance of the load resistor RL, which is expressed by $ILOAD=VOA/RL$. The charge activity related to the output voltage VOA only occurs when a current value of the inductor current If is larger than a current value of the load current ILOAD. The control circuit 140 is configured to determine that the charging procedure is finished according to the corresponding output voltage larger than the corresponding lower limit threshold value and the charging time larger than a charging time threshold value.

The control circuit 140 controls the input switch circuit 110 to perform the discharging procedure to discharge the inductor 120 and perform time counting of a discharging time. Under such a condition, the selected output circuit that is enabled keep operating according to the internal components to drain the inductor current If from the second terminal N2 to generate the corresponding output voltage at the corresponding output terminal. Under such a condition, the slope of the inductor current If is a result of a voltage difference between the ground terminal GND and the corresponding output voltage divided by the inductance of the inductor 120. Take the condition that the output circuit 130A is enabled as an example, the slope of the decreasing current thereof is $dIf/dt=(-VOA)/L$. The control circuit 140 is configured to determine that the discharging procedure is finished according to the discharging time larger than a discharging time threshold value to perform the determining procedure of a next iteration, in which the determining procedure of the next iteration determines the output circuit having the charging procedure and the discharging procedure to be performed thereon.

The configuration of the control circuit 140 and the execution of the operation of the control circuit 140 described above are described in detail in the following paragraphs.

Figure 2:
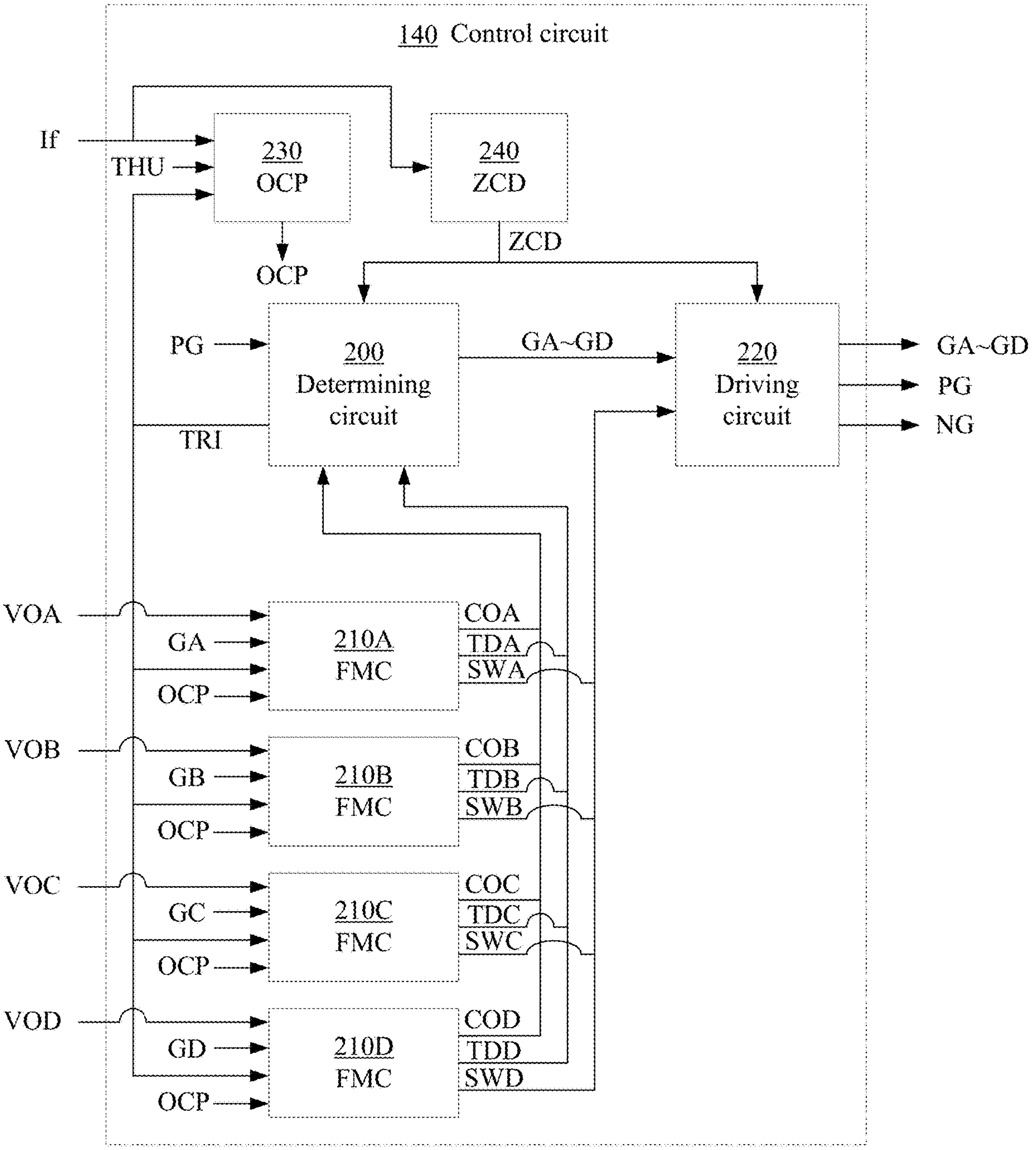
FIG. 2 illustrates a detailed diagram of the control circuit according to an embodiment of the present invention.

Reference is now made to FIG. 2. FIG. 2 illustrates a detailed diagram of the control circuit 140 according to an embodiment of the present invention. The control circuit 140 includes a determining circuit 200, a plurality of frequency modulation circuits 210A~210D (abbreviated as FMC in FIG. 2), a driving circuit 220, an over current protection circuit 230 (abbreviated as OCP in FIG. 2) and a zero current detection circuit 240 (abbreviated as ZCD in FIG. 2).

The determining circuit 200 is configured to receive a plurality of comparison results COA~COD generated according to the comparison between the output voltages VOA~VOD and the corresponding lower limit threshold value. The determining circuit 200 performs the determining procedure according to the comparison results COA~COD to determine the at least one candidate output circuit having the corresponding output voltage smaller than the corresponding lower limit threshold value from the output circuits 130A~130D and determine the selected output circuit from the at least one candidate output circuit according to the predetermined order.

Figures 3, 4:
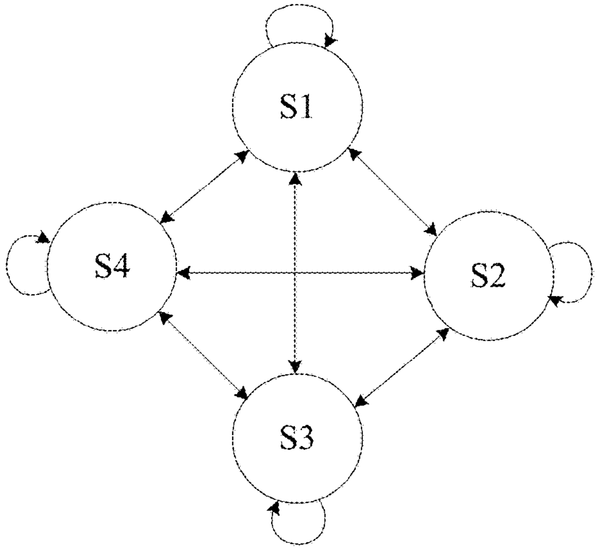
FIG. 3 illustrates a diagram of a finite state machine of the output circuits controlled by the determining circuit according to the determining procedure according to an embodiment of the present invention.
FIG. 4 illustrates a diagram of the relation of the comparison results and different states according to an embodiment of the present invention.

Reference is now made to FIG. 3 and FIG. 4 at the same time. FIG. 3 illustrates a diagram of a finite state machine of the output circuits 130A~130D controlled by the determining circuit 200 according to the determining procedure according to an embodiment of the present invention. FIG. 4 illustrates a diagram of the relation of the comparison results COA~COD and different states according to an embodiment of the present invention.

In FIG. 3, the state S1 indicates the condition that the output circuit 130A serves as the selected output circuit to be enabled. The state S2 indicates the condition that the output circuit 130B serves as the selected output circuit to be enabled. The state S3 indicates the condition that the output circuit 130C serves as the selected output circuit to be enabled. The state S4 indicates the condition that the output circuit 130D serves as the selected output circuit to be enabled.

In FIG. 4, the first four rows are the contents of the comparison results COA~COD. Take the comparison result COA as an example, the value of 1 indicates the condition that the output voltage VOA is smaller than the corresponding lower limit threshold value. The value of 0 indicates the condition that the output voltage VOA is not smaller than the corresponding lower limit threshold value. The value of X indicates that the occurrence of one of the two conditions described above. The fifth row is a current state. The sixth row is a next state determined according to the comparison results COA~COD.

For example, the current state is the state S1 (in which the output circuit 130A serves as the selected output circuit to be enabled). Under such a condition, once the comparison result COB is 1, no matter what the values of the comparison results COA and COC~COD are, the determining procedure sets the next state to be S2 (in which the output circuit 130B serves as the selected output circuit to be enabled) and the state in FIG. 3 switches from S1 to S2.

When the comparison result COB is 0 and the comparison result COC is 1, no matter what the values of the comparison results COA and COD are, the determining procedure sets the next state to be S3 (in which the output circuit 130C serves as the selected output circuit to be enabled) and the state in FIG. 3 switches from S1 to S3.

When comparison results COB~COC are 0 and the comparison result COD is 1, no matter what the value of the comparison result COA is, the determining procedure sets the next state to be S4 (in which the output circuit 130D serves as the selected output circuit to be enabled) and the state in FIG. 3 switches from S1 to S4.

When the comparison results COB~COD are 0 and when the comparison result COA is 1, the determining procedure sets the next state to remain S1 and the state in FIG. 3 switches from S1 to S1 itself. When the comparison results COA is 0, the determining circuit 200 determines that the candidate output circuit does not exist in the output circuits 130A~130D. The selected output circuit determined by the determining procedure in the previous iteration (which is the output circuit 130A) keeps serving as the selected output circuit.

When the current state is one of the states S2~S4, the determining procedure can determine the next state according to the same operation mechanism. From the relation illustrated in FIG. 4, the predetermined order in the present embodiment is the output circuit 130A, the output circuit 130B, the output circuit 130C and the output circuit 130D to correspond to the states S1, S2, S3 and S4.

In other words, when the condition that all the output voltages of the output circuits are smaller than the corresponding lower limit threshold value occurs, the determining procedure sets the output circuit 130A to have the highest priority to be turned on and sets the output circuit 130D to have the lowest priority to the turned on. When the condition that any one of output voltages of the output circuits is not smaller than the corresponding lower limit threshold value, the determining procedure skips such an output circuit and does not take such an output circuit into consideration. However, it is appreciated that the predetermined order may be arranged to have different orders based on practical requirements. The present invention is not limited thereto.

After the selected output circuit is determined, the determining circuit 200 generates the enabling signals GA~GD and a triggering signal TRI. One of the enabling signals GA~GD has the enabling state to enable the selected output circuit. The triggering signal TRI has a triggering state to perform time counting of the charging time on the selected output circuit. In an embodiment, both of the enabling state and triggering state are a high state.

Each of the frequency modulation circuits 210A~210D is disposed corresponding to a corresponding output circuit of the output circuits 130A~130D and receives a corresponding enabling signal of the enabling signals GA~GD and the triggering signal TRI.

Figure 5:
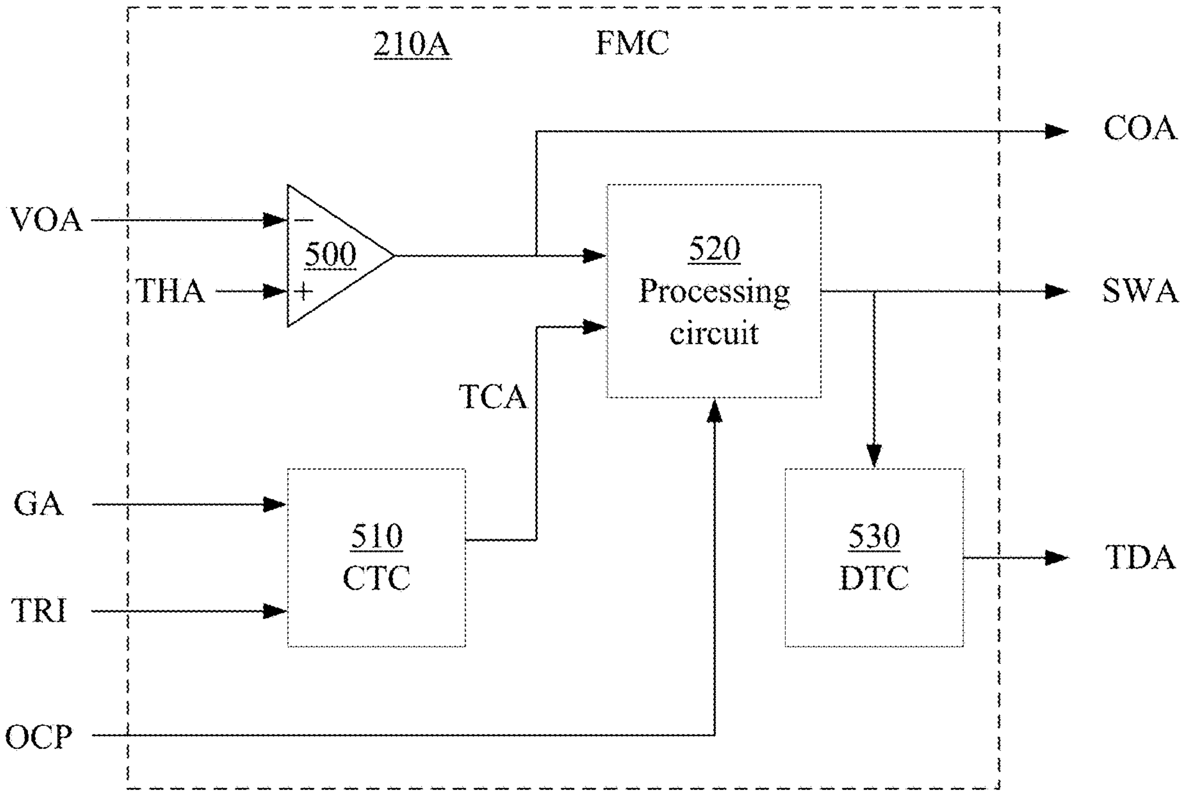
FIG. 5 illustrates a detailed block diagram of the frequency modulation circuit according to an embodiment of the present invention.

Reference is now made to FIG. 5. FIG. 5 illustrates a detailed block diagram of the frequency modulation circuit 210A according to an embodiment of the present invention. The frequency modulation circuit 210A includes a comparison circuit 500, a charging time counting circuit 510 (abbreviated as CTC in FIG. 5), a processing circuit 520 and a discharging time counting circuit 530 (abbreviated as DTC in FIG. 5).

The comparison circuit 500 is configured to receive and compare the corresponding output voltage VOA from the output circuit 130A and the corresponding lower limit threshold value THA to generate a corresponding comparison result of the comparison results COA~COD. In an embodiment, the determining circuit 200 receives the comparison result COA from the comparison circuit 500.

The charging time counting circuit 510 is configured to perform time counting of the charging time according to the corresponding enabling signal GA having the enabling state and the triggering signal TRI having the triggering state to generate a charging time counting result TCA.

More specifically, upon receiving the corresponding enabling signal GA having the enabling state and the triggering signal TRI having the triggering state, the charging time counting circuit 510 starts to perform time counting of the charging time. When the corresponding enabling signal GA having a non-enabling state or the triggering signal TRI having the non-triggering state is received, the charging time counting circuit 510 does not perform time counting of the charging time. In an embodiment, both of the enabling state and the triggering state are the high state and both of the non-enabling state and the non-triggering state are the low state.

The processing circuit 520 is configured to receive the corresponding comparison result COA and the charging time counting result TCA to generate a corresponding switching signal SWA of a plurality of switching signals SWA~SWD. When the comparison result COA indicates that the output voltage VOA is not larger than the corresponding lower limit threshold value THA (in which the state of the value 0 switches to the state of the value 1 to generate a rising edge), the processing circuit 520 sets the switching signal SWA to have the charging state. When the comparison result COA indicates that the output voltage VOA is larger than the corresponding lower limit threshold value THA (in which the state of the value 1 switches to the state of the value 0 to generate a falling edge) and the charging time counting result TCA indicates that the charging time is larger than the charging time threshold value, the processing circuit 520 sets the switching signal SWA to have the non-charging state. In an embodiment, the charging state is the high state and the non-charging state is the low state. The switching signals SWA controls the driving circuit 220 according to the charging state and the non-charging state thereof.

The discharging time counting circuit 530 is configured to receive the corresponding switching signal SWA to perform time counting of the discharging time when the corresponding switching signal SWA switches from the charging state to the non-charging state and generate a discharging time counting result TDA to the determining circuit 200 in FIG. 2, such that the determining circuit 200 performs the determining procedure of the next iteration when the discharging time counting result TDA indicates that the discharging time is larger than the discharging time threshold value.

The frequency modulation circuits 210B~210D may include the configuration the same as the frequency modulation circuits 210A and are configured to receive the corresponding output voltages VOB~VOD, the corresponding enabling signals GB~GD and the triggering signal TRI, to generate the comparison results COB~COD, the switching signals SWB~SWD and the discharging time counting results TDB~TDD based on the operation method of the frequency modulation circuit 210A.

The driving circuit 220 is configured to receive and output the enabling signals GA~GD to enable the selected output circuit according to one of the enabling signals having the enabling state. More specifically, the enabling signal having the enabling state turns on the output transistor to enable the selected output circuit.

For example, when the selected output circuit is the output circuit 130A, the driving circuit 220 outputs enabling signal GA having the enabling state to turn on the output transistor MOA and enable the output circuit 130A and outputs the enabling signals GB~GD having the non-enabling state to turn off output transistors MOB~MOD to disable the output circuits 130B~130D.

In practical implementation, the driving circuit 220 may receive the enabling signals GA~GD to generate an additional group of signals to enable or disable the output circuits. The present invention is not limited to a certain enabling and disabling method.

The driving circuit 220 is further configured to receive the switching signals SWA~SWD and determine whether to control the input switch circuit 110 or not according to the states of the enabling signals GA~GD. When one of the enabling signals GA~GD has the enabling state and a corresponding one of the switching signals SWA~SWD has the charging state, the driving circuit 220 generates the first input control signal PG and the second input control signal NG each having the low state to control the input switch circuit 110 to perform the charging procedure to charge the inductor 120. When one of the enabling signals GA~GD has the enabling state and all the switching signals SWA~SWD have the non-charging state, the driving circuit 220 generates the first input control signal PG and the second input control signal NG each having the high state to control the input switch circuit 110 to perform the discharging procedure to discharge the inductor 120.

For example, when the selected output circuit is the output circuit 130A, the processing circuit 520 of the frequency modulation circuit 210A generates switching signal SWA having the charging state according to the comparison result COA. The processing circuits 520 of the frequency modulation circuits 210B~210D generate the switching signals SWB~SWD having the non-charging state according to the comparison results COB~COD. The driving circuit 220 controls the input switch circuit 110 to perform the charging procedure to charge the inductor 120 according to the enabling signal GA having the enabling state and switching signals SWA~SWD having the states described above.

In an embodiment, since the triggering signal TRI is generated by the determining circuit 200, the determining circuit 200 is configured to receive the first input control signal PG to set the triggering signal to have the non-triggering state when the first input control signal turns on the input P-type transistor to activate the charging time counting circuit.

When the processing circuit 520 of the frequency modulation circuit 210A generates the switching signal SWA having the non-charging state according to the corresponding comparison result COA and the charging time counting result TCA, the input switch circuit 110 performs the discharging procedure to discharge the inductor 120 according to the switching signals SWA~SWD.

The over current protection circuit 230 is configured to start to compare the inductor current If and the upper limit value THU to generate an over current detection result OCP according to the triggering signal TRI having the triggering state. In an embodiment, the over current detection result OCP indicates that the inductor current If is not larger than upper limit value THU when the value is 0 and indicates that the inductor current If is larger than upper limit value THU when the value is 1.

The processing circuit 520 of each of the frequency modulation circuits 210A~210D directly sets corresponding switching signals SWA~SWD to have the non-charging state when the over current detection result OCP indicates that the inductor current If is larger than the upper limit value THU. As a result, each of the frequency modulation circuits 210A~210D may detect the inductor current If that is too large according to the operation of the over current protection circuit 230 when the input switch circuit 110 performs the charging procedure, so as to set the switching signals to have the non-charging state to terminate the charging procedure to prevent the current becoming too large. The input switch circuit 110 further performs the discharging procedure to discharge the inductor 120.

The zero current detection circuit 240 is configured to detect the inductor current If to generate a zero current detection result ZCD. In an embodiment, the zero current detection result ZCD indicates that the inductor current If has a current value larger than 0 when the value is 0 and indicates that the inductor current If has a current value smaller than or equaling to 0 when the value is 1.

The driving circuit 220 performs the zero current protection procedure when one of the enabling signals GA~GD has the enabling state, all of the switching signals SWA~SWD have the non-charging state and the zero current detection result ZCD is 1 such that the input switch circuit 110 is disabled. In an embodiment, the driving circuit 220 may set the first input control signal PG to have the high state and the second input control signal NG to have the low state to turn off both of the input P-type transistor MPI and the input N-type transistor MNI to disable the input switch circuit 110.

As a result, the driving circuit 220 may directly disable the input switch circuit 110 when the inductor current If having the current value smaller than or equaling to 0 is detected by the zero current detection circuit 240 during the performance of the discharging procedure of the input switch circuit 110 to terminate the discharging procedure to prevent the current becoming even lower. The determining circuit 200 further determines the discharging procedure is finished when the value of the zero current detection result ZCD is 1 to perform the determining procedure in the next iteration.

Figure 6:
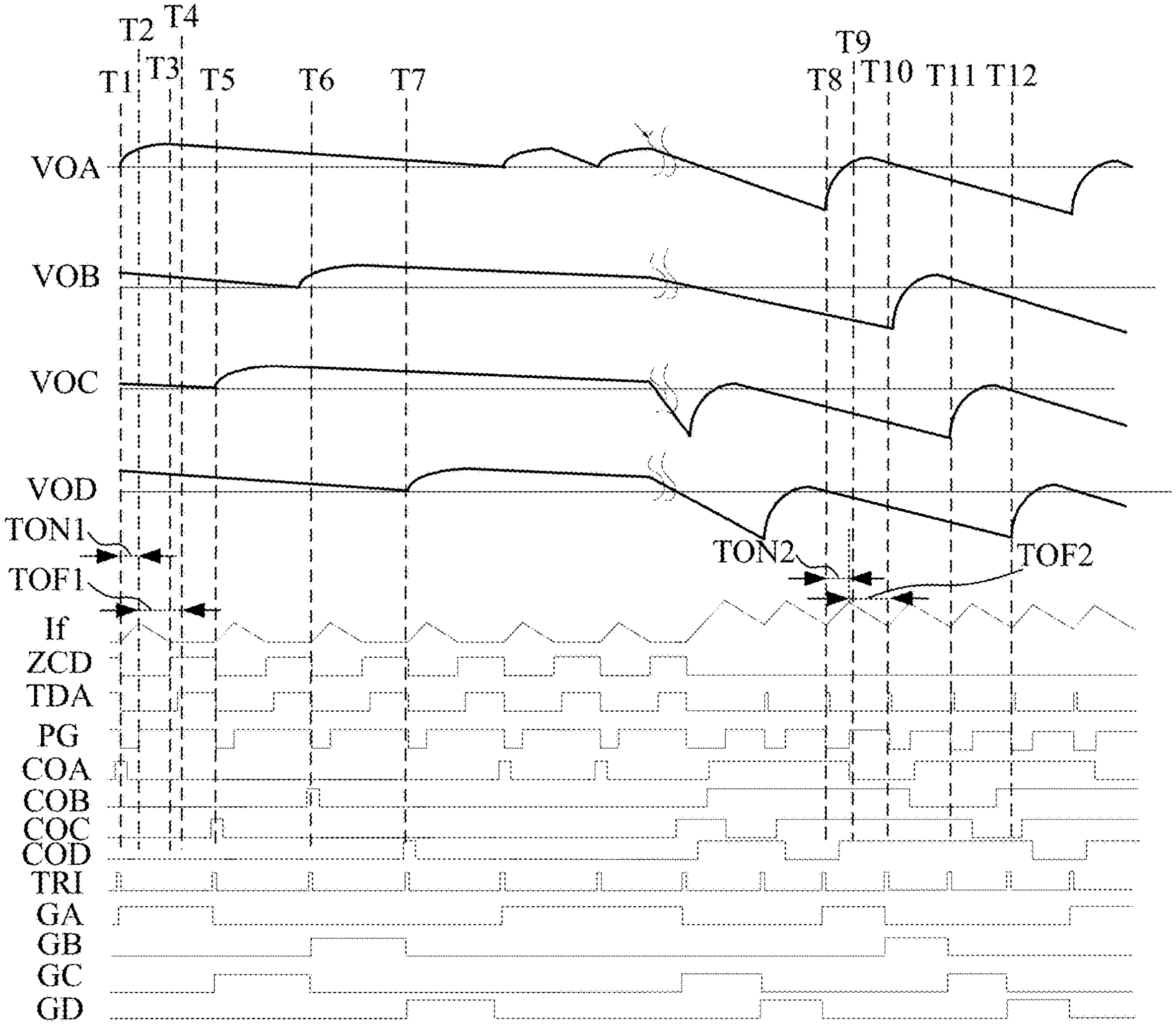
FIG. 6 illustrates a waveform diagram of a plurality of signals during the operation of the multi-output voltage conversion apparatus according to an embodiment of the present invention.

Reference is now made to FIG. 6. FIG. 6 illustrates a waveform diagram of a plurality of signals during the operation of the multi-output voltage conversion apparatus 100 according to an embodiment of the present invention. The x-axis illustrated corresponding to the output voltages VOA~VOD represents the lower limit threshold value. The operation of multi-output voltage conversion apparatus 100 in a practical example is described in accompanied with the components illustrated in FIG. 1, FIG. 2 and FIG. 5.

In the time spot T1, the comparison result COA indicates that the output voltage VOA is smaller than the corresponding lower limit threshold value such that the determining circuit 200 determines the output circuit 130A to serve as the selected output circuit to be enabled to generate the enabling signal GA having the enabling state, the enabling signals GB~GD having the non-enabling state, and the triggering signal TRI having the triggering state.

The driving circuit 220 turns on the input P-type transistor MPI of the input switch circuit 110 according to the low state of the first input control signal PG to perform the charging procedure. At a time spot T2, the driving circuit 220 finishes the charging procedure according to the amount of the charging time threshold value. As a result, a time length TON1 from the time spot T1 to the time spot T2 is equivalent to the amount of the charging time threshold value. During the time spot T1 to the time spot T2, the inductor current If keeps increasing due to the charging procedure.

After the time spot T2, the driving circuit 220 controls the input switch circuit 110 to perform the discharging procedure. At a time spot T3, since the zero current detection circuit 240 detects that the inductor current If becomes zero and generates the zero current detection result ZCD having the value of 1, the input switch circuit 110 is disabled. During the time spot T2 to the time spot T3, the inductor current If keeps decreasing due to the discharging procedure.

However, at a time spot T4, the value of the discharging time counting result TDA becomes 1 to indicate that the discharging time is larger than the discharging time threshold value. As a result, the time length TOF1 from the time spot T2 to the time spot T4 is equivalent the amount of the discharging time threshold value.

At time spots T5, T6 and T7, the determining circuit 200 in turn determines that the output circuit 130C, 130B and 130D serve as the selected output circuit to be enabled according to the comparison results COC, COB and COD. The detail is not described herein. In an embodiment, since a period that the inductor current If stays in zero current state exists (such that the input N-type transistor MNI and the input P-type transistor MPI turn off), such a period corresponds to a discontinuous current mode (DCM) condition.

Similarly, at a time spot T8, the comparison results COA indicates that the output voltage VOA is smaller than the corresponding lower limit threshold value. The determining circuit 200 determines the output circuit 130A to serve as the selected output circuit to be enabled to generate the enabling signal GA having the enabling state, the enabling signals GB~GD having the non-enabling state, and the triggering signal TRI having the triggering state.

The driving circuit 220 turns on the input P-type transistor MPI of the input switch circuit 110 according to the low state of the first input control signal PG to perform the charging procedure and determines that the charging procedure is finished at a time spot T9 according to the charging time larger than the threshold value and the corresponding output voltage VOA larger than the lower limit threshold value. As a result, the time length TON2 from the time spot T8 to the time spot T9 is longer than the time length TON1. From the time spot T8 to the time spot T9, the inductor current If keeps increasing due to the charging procedure.

After the time spot T9, the driving circuit 220 controls the input switch circuit 110 to perform the discharging procedure. At a time spot T10, the value of the discharging time counting result TDA is 1, indicating that the discharging time is larger than the discharging time threshold value. From the time spot T9 to the time spot T10, the inductor current If keeps decreasing due to the discharging procedure. Further, the time length TOF2 from the time spot T9 to the time spot T10 is equivalent to the amount of the discharging time threshold value.

At time spots T10, T11 and T12, the determining circuit 200 in turns determines that the output circuit 130B~130D serve as the selected output circuit to be enabled according to the comparison results COB~COD. The detail is not described herein. In an embodiment, since the inductor current If is larger than 0 within such a period, such a period corresponds to a continuous current mode (CCM) condition.

In an embodiment, the charging time threshold value and the discharging time threshold value that the control circuit 140 uses to determine whether the charging procedure and the discharging procedure are finished can be dynamically adjusted according to a predetermined equation.

Take the output circuit 130A as an example, the corresponding charging time threshold value can be a product of a first reciprocal, of a difference between the input voltage Vin and the corresponding output voltage VOA and a first constant m, which is expressed as m/(Vin-VOA). The discharging time threshold value can be a product of a second reciprocal of the corresponding output voltage VOA and a second constant n, which is expressed as n/(VOA). The second constant n is larger than the first constant m.

Take the period from the time spot T1 to the time spot T7 in FIG. 6 corresponding to the discontinuous current mode condition as an example, the output voltage of each of the output circuits becomes larger than the lower limit threshold quickly due to the charging procedure. However, the discharging procedure is still performed after the charging time reaches the charging time threshold value. The equation of the discharging time threshold value described above can guarantee the detection of the zero current in discontinuous current mode condition is earlier than the reaching of the discharging time threshold value such that the inductor current If starts from 0 in the next charging procedure and a smaller ripple is generated. Further, the control circuit 140 starts to perform the charging procedure only when any one of the output voltages is smaller than the lower limit threshold value.

Take the period from the time spot T8 to the time spot T11 in FIG. 6 corresponding to the continuous current mode condition as an example, the output voltages of the output circuits are insufficient such that the output circuits are enabled in turn according to the predetermined order. Since the charging procedure is performed until the output voltages is sufficient, the requirement of the continuous current mode is satisfied. Further, when the condition switches from the discontinuous current mode to the continuous current mode occurs, the output voltages detection mechanism provided by the comparison circuit has a fast transient response. When some of the output circuits are in the discontinuous current mode and some of the output circuits are in the continuous current mode, the output circuits still are enabled in turn while the output circuits having the sufficient output voltages are skipped to keep the output voltages of these output circuits from being too high.

The multi-output voltage conversion apparatus having fast load transient response in the present invention dynamically determines the output circuits to be enabled according to the relation between the output voltages and the upper limit value, such that not only a fast transient response is obtained, but also either the charging time that is too short in a light-load condition or the discharging time that is too short in the heavy load condition can be avoided by configuring the charging time threshold value and the discharging time threshold value. Both the requirements of the light load condition and the heavy load condition can be satisfied.

Figure 7:
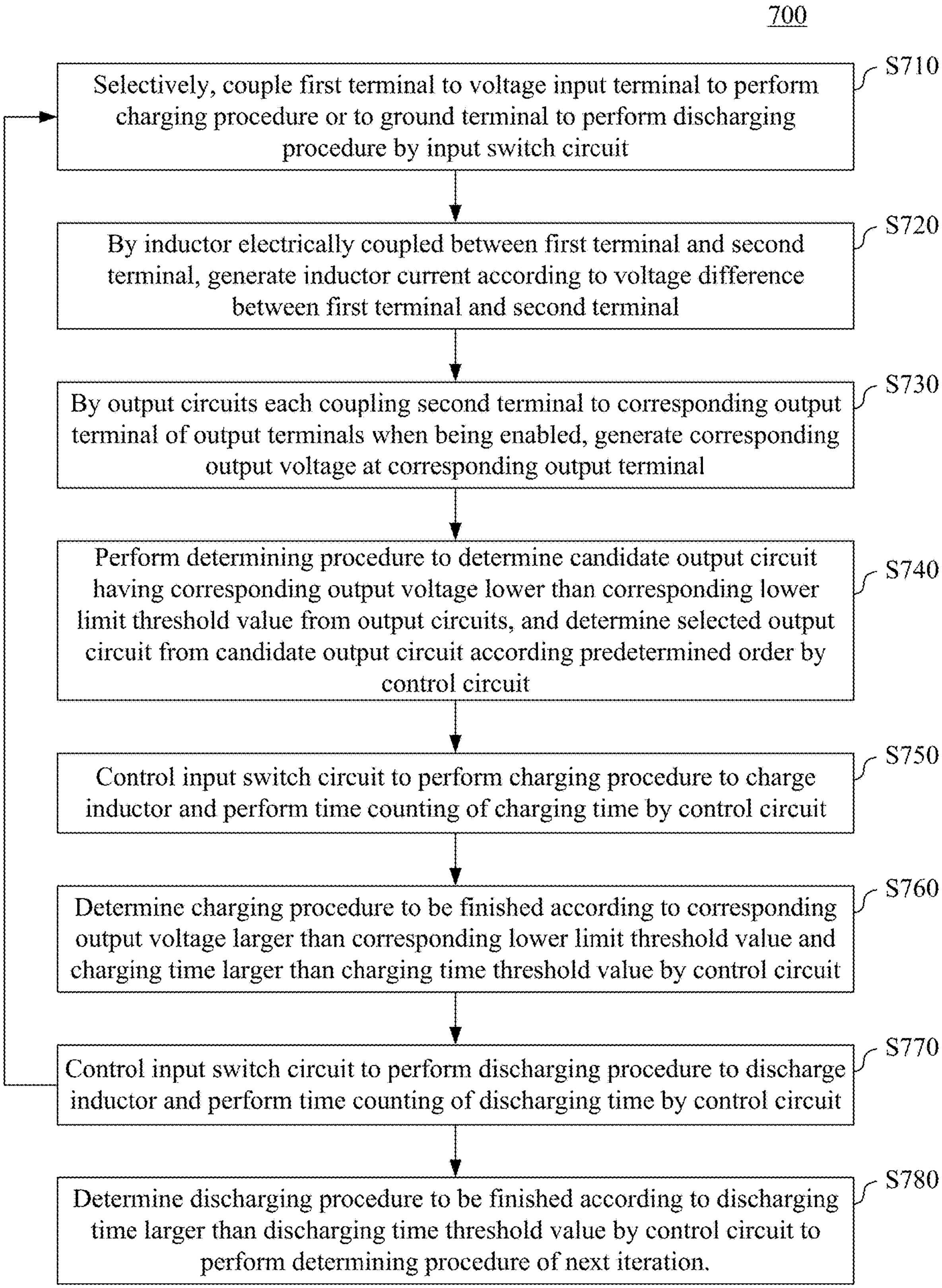
FIG. 7 illustrates a flow chart of a multi-output voltage conversion apparatus operation method according to an embodiment of the present invention.

Reference is now made to FIG. 7. FIG. 7 illustrates a flow chart of a multi-output voltage conversion apparatus operation method 700 according to an embodiment of the present invention.

Besides the apparatus described above, the present invention further discloses the multi-output voltage conversion apparatus operation method 700 having fast load transient response that can be used in such as, but not limited to the multi-output voltage conversion apparatus 100 illustrated in FIG. 1. An embodiment of the multi-output voltage conversion apparatus operation method 700 is illustrated in FIG. 7 and includes the steps outlined below.

In step S710, selectively, the first terminal N1 is coupled to the voltage input terminal IN to perform the charging procedure or to the ground terminal GND to perform the discharging procedure by the input switch circuit 110.

In step S720, by the inductor 120 electrically coupled between the first terminal N1 and the second terminal N2, the inductor current If is generated according to the voltage difference between the first terminal N1 and the second terminal N2.

In step S730, by the output circuits 130A~130D each coupling the second terminal N2 to the corresponding output terminal of the output terminals OUA~OUD when being enabled, the corresponding output voltage of the output voltages VOA~VOD is generated at the corresponding output terminal.

In step S740, the determining procedure is performed to determine the candidate output circuit having the corresponding output voltage lower than the corresponding lower limit threshold value from the output circuits 130A~130D, and the selected output circuit is determined from the candidate output circuit according the predetermined order by the control circuit 140.

In step S750, the input switch circuit 110 is controlled to perform the charging procedure to charge the inductor 120 and perform time counting of a charging time by the control circuit 140.

In step S760, the charging procedure is determined to be finished according to the corresponding output voltage larger than the corresponding lower limit threshold value and the charging time larger than a charging time threshold value by the control circuit 140.

In step S770, the input switch circuit 110 is controlled to perform the discharging procedure to discharge the inductor 120 and perform time counting of a discharging time by the control circuit 140.

In step S780, the discharging procedure is determined to be finished according to the discharging time larger than a discharging time threshold value by the control circuit 140 to perform the determining procedure of a next iteration.

Figure 8:
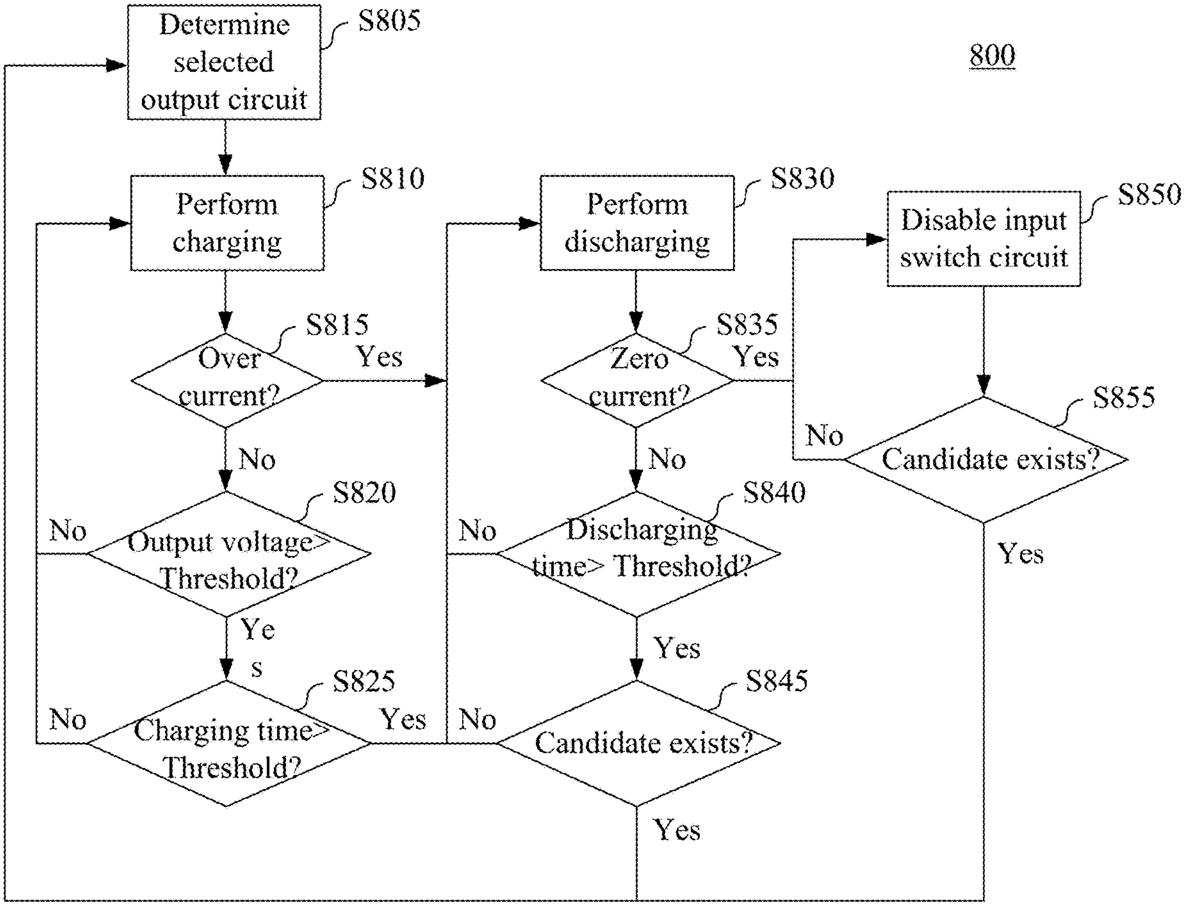
FIG. 8 illustrates a more detailed flow chart of the charging procedure and the discharging procedure performed by the control circuit according to an embodiment of the present invention.

Reference is now made to FIG. 8. FIG. 8 illustrates a more detailed flow chart of the charging procedure and the discharging procedure performed by the control circuit 140 according to an embodiment of the present invention.

In step S805, the control circuit 140 determines the selected output circuit to be enabled.

In step S810, the control circuit 140 controls the input switch circuit 110 to perform the charging procedure.

In step S815, the control circuit 140 determines whether an over current condition occurs according to the over current detection result OCP.

In step S820, when the over current condition does not occur, the control circuit 140 determines whether the corresponding output voltage is larger than the corresponding lower limit threshold value. When the corresponding output voltage is not larger than the corresponding lower limit threshold value, the flow goes back to step S810 to keep performing the charging procedure.

In step S825, when the corresponding output voltage is larger than the corresponding lower limit threshold value, the control circuit 140 determines that whether the charging time is larger than the charging time threshold value. When the charging time is not larger than the charging time threshold value, the flow goes back to step S810 to keep performing the charging procedure.

In step S830, when the charging time is larger than the charging time threshold value or when the over current condition is determined to occur in step S815, the control circuit 140 controls the input switch circuit 110 to perform the discharging procedure.

In step S835, the control circuit 140 determines whether the zero current condition occurs according to the zero current detection result ZCD.

In step S840, when the zero current condition does not occur, the control circuit 140 determines whether the discharging time is larger than the discharging time threshold value. When the discharging time is not larger than the discharging time threshold value, the flow goes back to step S830 to keep performing the discharging procedure.

In step S845, when the discharging time is larger than the discharging time threshold value, the control circuit 140 determines whether the candidate output circuit exists. When the candidate output circuit does not exist, the flow goes back to step S830 to keep performing the discharging procedure. When the candidate output circuit exists, the flow goes back to step S805 to perform the determining procedure.

In step S850, when the zero current condition is determined to occur in step S835, the control circuit 140 disables the input switch circuit 110.

In step S855, the control circuit 140 determines whether the candidate output circuit exists. When the candidate output circuit does not exist, the flow goes back to step S850 to keep disabling the input switch circuit 110. When the candidate output circuit exists, the flow goes back to step S805 to perform the determining procedure.

It is appreciated that the embodiments described above are merely an example. In other embodiments, it is appreciated that many modifications and changes may be made by those of ordinary skill in the art without departing, from the spirit of the invention.

In summary, the multi-output voltage conversion apparatus and the multi-output voltage conversion apparatus operation method having fast load transient response of the present invention dynamically determine the output circuits to be enabled according to the relation between the output voltages and the upper limit value, such that not only a fast transient response is obtained, but also either the charging time that is too short in a light-load condition or the discharging time that is too short in the heavy load condition can be avoided by configuring the charging time threshold value and the discharging time threshold value. Both the requirements of the light load condition and the heavy load condition can be satisfied.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A multi-output voltage conversion apparatus having a fast load transient response, comprising:

an input switch circuit configured to selectively couple a first terminal to a voltage input terminal to perform a charging procedure or couple the first terminal to a ground terminal to perform a discharging procedure;

an inductor electrically coupled between the first terminal and a second terminal and configured to generate an inductor current according to a voltage difference between the first terminal and the second terminal;

a plurality of output circuits each coupling the second terminal to a corresponding output terminal of a plurality of output terminals when being enabled, the corresponding output terminal being configured to generate a corresponding output voltage of a plurality of output voltages; and a control circuit electrically coupled to the input switch circuit and the output circuits and configured to:

perform a determining procedure to determine at least one candidate output circuit having the corresponding output voltage lower than a corresponding lower limit threshold value from the output circuits, and determine a selected output circuit from the at least one candidate output circuit according to a predetermined order;

control the input switch circuit to perform the charging procedure to charge the inductor and perform time counting of a charging time;

determine that the charging procedure is finished according to the corresponding output voltage larger than the corresponding lower limit threshold value and the charging time larger than a charging time threshold value;

control the input switch circuit to perform the discharging procedure to discharge the inductor and perform time counting of a discharging time; and determine that the discharging procedure is finished according to the discharging time larger than a discharging time threshold value to perform the determining procedure of a next iteration;

wherein the lower limit threshold value corresponds to a predetermined output voltage associated with a load for the selected output circuit;

and wherein the charging time threshold value is based on the difference between an input voltage at the voltage input terminal and the corresponding output voltage and the discharging time threshold value is based on the corresponding output voltage of the selected output circuit.

2. The multi-output voltage conversion apparatus of claim 1, wherein the control circuit comprises a determining circuit configured to:

receive a plurality of comparison results generated according to the comparison between the output voltages and the corresponding lower limit threshold value;

perform the determining procedure according to the comparison results to determine the at least one candidate output circuit and determine the selected output circuit from the at least one candidate output circuit according to the predetermined order; and generate a plurality of enabling signals and a triggering signal, wherein one of the enabling signals has an enabling state to enable the selected output circuit, and the triggering signal has a triggering state to perform time counting of the charging time on the selected output circuit.

3. The multi-output voltage conversion apparatus of claim 2, wherein the control circuit comprises a plurality of frequency modulation circuits each disposed corresponding to a corresponding output circuit of the output circuits and each receiving a corresponding enabling signal of the enabling signals, the corresponding output voltage of the output voltages and the triggering signal, the frequency modulation circuits each comprising:

a comparison circuit configured to receive and compare the corresponding output voltage and the corresponding lower limit threshold value to generate a corresponding comparison result of the comparison results;

a charging time counting circuit configured to perform time counting of the charging time according to the corresponding enabling signal having the enabling state and the triggering signal having the triggering state to generate a charging time counting result;

a processing circuit configured to receive the corresponding comparison result and the charging time counting result to generate a corresponding switching signal of a plurality of switching signals to set the corresponding switching signal to have a charging state when the corresponding comparison result indicates that the corresponding output voltage is not larger than the corresponding lower limit threshold value, and set the corresponding switching signal to have a non-charging state when the corresponding comparison result indicates that the corresponding output voltage is larger than the corresponding lower limit threshold value; and a discharging time counting circuit configured to receive the corresponding switching signal to perform time counting of the discharging time when the corresponding switching signal switches from the charging state to the non-charging state and generate a discharging time counting result to the determining circuit, such that the determining circuit performs the determining procedure of the next iteration when the discharging time counting result indicates that the discharging time is larger than the discharging time threshold value.

4. The multi-output voltage conversion apparatus of claim 3, wherein the control circuit comprises a driving circuit configured to:

receive and output the enabling signals to enable the selected output circuit according to one of the enabling signals having the enabling state; and receive the switching signals to control the input switch circuit to perform the charging procedure to charge the inductor when one of the enabling signals is at the enabling state and a corresponding one of the switching signals is at the charging state, and control the input switch circuit to perform the discharging procedure to discharge the inductor when one of the enabling signals is at the enabling state and all the switching signals are at the non-charging state.

5. The multi-output voltage conversion apparatus of claim 4, wherein the input switch circuit comprises an input P-type transistor and an input N-type transistor in turn electrically coupled between the voltage input terminal and a ground terminal through the first terminal;

the driving circuit is further configured to generate a first input control signal and a second input control signal to respectively turn on the input P-type transistor and turn off the input N-type transistor in the charging procedure to charge the inductor, and respectively turn off the input P-type transistor and turn on the input N-type transistor in the discharging procedure to discharge the inductor; and the determining circuit is configured to receive the first input control signal to set the triggering signal to have a non-triggering state when the first input control signal turns off the input P-type transistor, so as to reset the charging time counting circuit.

6. The multi-output voltage conversion apparatus of claim 4, wherein each of the output circuits comprises an output transistor electrically coupled to the second terminal and the corresponding output terminal and a RC circuit electrically coupled between the corresponding output terminal and the ground terminal; and the driving circuit is configured to output the enabling signals to the output circuits so as to turn on the output transistor comprised by the selected output circuit according to one of the enabling signals having the enabling state, and turn off the output transistor comprised by each of the other output circuits according to the enabling signals do not have the enabling state.

7. The multi-output voltage conversion apparatus of claim 4, wherein the control circuit comprises an over current protection circuit configured to start to compare the inductor current of the first terminal and an upper limit value to generate an over current detection result;

wherein the processing circuit comprised by each of the frequency modulation circuits directly set the corresponding switching signal to have the non-charging state when the over current detection result indicates that the inductor current is larger than the upper limit value.

8. The multi-output voltage conversion apparatus of claim 4, wherein the control circuit comprises a zero current detection circuit configured to detect the inductor current at the first terminal to generate a zero current detection result;

wherein the driving circuit performs a zero current protection procedure when one of the enabling signals is at the enabling state, all of the switching signals are at the non-charging state and the zero current detection result indicates that the inductor current is zero, so as to disable the input switch circuit;

wherein the determining circuit performs the determining procedure when the zero current detection result indicates that the inductor current is zero.

9. The multi-output voltage conversion apparatus of claim 1, wherein the charging time threshold value is a product of a first reciprocal, of a difference between an input voltage at the voltage input terminal and the corresponding output voltage, and a first constant, and the discharging time threshold value is a product of a second reciprocal of the corresponding output voltage and a second constant, wherein the second constant is larger than the first constant.

10. The multi-output voltage conversion apparatus of claim 1, wherein the control circuit sets the selected output circuit selected according to the determining procedure in a previous iteration as the selected output circuit in a current iteration when the at least one candidate output circuit in the output circuits is determined to not exist in the determining procedure.

11. A multi-output voltage conversion apparatus operation method having fast load transient response, comprising:

selectively coupling a first terminal to a voltage input terminal to perform a charging procedure or coupling the first terminal to a ground terminal to perform a discharging procedure by an input switch circuit;

by an inductor electrically coupled between the first terminal and a second terminal, generating an inductor current according to a voltage difference between the first terminal and the second terminal;

by a plurality of output circuits each coupling the second terminal to a corresponding output terminal of a plurality of output terminals, enabled for generating a corresponding output voltage of a plurality of output voltages at the corresponding output terminal;

performing a determining procedure to determine at least one candidate output circuit having the corresponding output voltage lower than a corresponding lower limit threshold value from the output circuits, and determining a selected output circuit from the at least one candidate output circuit according to a predetermined order by a control circuit electrically coupled to the input switch circuit and the output circuits;

controlling the input switch circuit to perform the charging procedure to charge the inductor and perform time counting of a charging time by the control circuit;

determining that the charging procedure is finished according to the corresponding output voltage larger than the corresponding lower limit threshold value and the charging time larger than a charging time threshold value by the control circuit;

controlling the input switch circuit to perform the discharging procedure to discharge the inductor and perform time counting of a discharging time by the control circuit; and determining that the discharging procedure is finished according to the discharging time larger than a discharging time threshold value by the control circuit to perform the determining procedure of a next iteration;

wherein the lower limit threshold value corresponds to a predetermined output voltage associated with a load for the selected output circuit; and wherein the charging time threshold value is based on the difference between an input voltage at the voltage input terminal and the corresponding output voltage and the discharging time threshold value is based on the corresponding output voltage of the selected output circuit.

12. The multi-output voltage conversion apparatus operation method of claim 11, wherein the charging time threshold value is a product of a first reciprocal, of a difference between an input voltage at the voltage input terminal and the corresponding output voltage, and a first constant, and the discharging time threshold value is a product of a second reciprocal of the corresponding output voltage and a second constant, wherein the second constant is larger than the first constant.

13. The multi-output voltage conversion apparatus operation method of claim 11, further comprising:

setting the selected output circuit selected according to the determining procedure in a previous iteration as the selected output circuit in a current iteration by the control circuit when the at least one candidate output circuit in the output circuits is determined to not exist in the determining procedure.

14. The multi-output voltage conversion apparatus operation method of claim 11, further comprising:

receiving a plurality of comparison results generated according to the comparison between the output voltages and the corresponding lower limit threshold value by a determining circuit comprised by the control circuit;

performing the determining procedure according to the comparison results by the determining circuit to determine the at least one candidate output circuit and determine the selected output circuit from the at least one candidate output circuit according to the predetermined order; and generating a plurality of enabling signals and a triggering signal by the determining circuit, wherein one of the enabling signals has an enabling state to enable the selected output circuit, and the triggering signal has a triggering state to perform time counting of the charging time on the selected output circuit.

15. The multi-output voltage conversion apparatus operation method of claim 14, wherein the control circuit comprises a plurality of frequency modulation circuits each disposed corresponding to a corresponding output circuit of the output circuits and each receiving a corresponding enabling signal of the enabling signals, the corresponding output voltage of the output voltages and the triggering signal, the multi-output voltage conversion apparatus operation method further comprising:

receiving and comparing the corresponding output voltage and the corresponding lower limit threshold value to generate a corresponding comparison result of the comparison results by a comparison circuit comprised by each of the frequency modulation circuits;

performing time counting of the charging time according to the corresponding enabling signal having the enabling state and the triggering signal having the triggering state to generate a charging time counting result by a charging time counting circuit comprised by each of the frequency modulation circuits;

receiving the corresponding comparison result and the charging time counting result to generate a corresponding switching signal of a plurality of switching signals by a processing circuit comprised by each of the frequency modulation circuits to set the corresponding switching signal to have a charging state when the corresponding comparison result indicates that the corresponding output voltage is not larger than the corresponding lower limit threshold value, and set the corresponding switching signal to have a non-charging state when the corresponding comparison result indicates that the corresponding output voltage is larger than the corresponding lower limit threshold value; and receiving the corresponding switching signal by a discharging time counting circuit comprised by each of the frequency modulation circuits to perform time counting of the discharging time when the corresponding switching signal switches from the charging state to the non-charging state and generate a discharging time counting result to the determining circuit, such that the determining circuit performs the determining procedure of the next iteration when the discharging time counting result indicates that the discharging time is larger than the discharging time threshold value.

16. The multi-output voltage conversion apparatus operation method of claim 15, further comprising:

receiving and outputting the enabling signals to enable the selected output circuit according to one of the enabling signals having the enabling state by a driving circuit comprised by the control circuit; and receiving the switching signals to control the input switch circuit to perform the charging procedure by the driving circuit to charge the inductor when one of the enabling signals is at the enabling state and a corresponding one of the switching signals is at the charging state, and control the input switch circuit to perform the discharging procedure by the driving circuit to discharge the inductor when one of the enabling signals is at the enabling state and all the switching signals are at the non-charging state.

17. The multi-output voltage conversion apparatus operation method of claim 16, wherein the input switch circuit comprises an input P-type transistor and an input N-type transistor in turn electrically coupled between the voltage input terminal and a ground terminal through the first terminal, the multi-output voltage conversion apparatus operation method further comprising:

generating a first input control signal and a second input control signal by the driving circuit to respectively turn on the input P-type transistor and turn off the input N-type transistor in the charging procedure to charge the inductor, and respectively turn off the input P-type transistor and turn on the input N-type transistor in the discharging procedure to discharge the inductor; and receiving the first input control signal by the determining circuit to set the triggering signal to have a non-triggering state when the first input control signal turns off the input P-type transistor, so as to reset the charging time counting circuit.

18. The multi-output voltage conversion apparatus operation method of claim 16, wherein each of the output circuits comprises an output transistor electrically coupled to the second terminal and the corresponding output terminal and a RC circuit electrically coupled between the corresponding output terminal and the ground terminal, the multi-output voltage conversion apparatus operation method further comprising:

outputting the enabling signals to the output circuits by the driving circuit so as to turn on the output transistor comprised by the selected output circuit according to one of the enabling signals having the enabling state, and turn off the output transistor comprised by each of the other output circuits according to the enabling signals do not have the enabling state.

19. The multi-output voltage conversion apparatus operation method of claim 16, further comprising:

starting to compare the inductor current of the first terminal and an upper limit value to generate an over current detection result by an over current protection circuit comprised by the control circuit; and directly setting the corresponding switching signal to have the non-charging state by the processing circuit comprised by each of the frequency modulation circuits when the over current detection result indicates that the inductor current is larger than the upper limit value.

20. The multi-output voltage conversion apparatus operation method of claim 16, further comprising:

detecting the inductor current at the first terminal to generate a zero current detection result by a zero current detection circuit comprised by the control circuit;

performing a zero current protection procedure by the driving circuit when one of the enabling signals is at the enabling state, all of the switching signals are at the non-charging state and the zero current detection result indicates that the inductor current is zero, so as to disable the input switch circuit; and performing the determining procedure by the determining circuit when the zero current detection result indicates that the inductor current is zero.

* * * * *